United States Patent [19]

Druskis et al.

[11] Patent Number: 5,079,878
[45] Date of Patent: Jan. 14, 1992

[54] SOFT CONTACT LENS PROCESSING AID

[75] Inventors: Robert J. Druskis, Webster; Rose A. Milne, Penfield, both of N.Y.

[73] Assignee: Bausch & Lomb Incorporated, Rochester, N.Y.

[21] Appl. No.: 651,816

[22] Filed: Jan. 7, 1991

Related U.S. Application Data

[63] Continuation-in-part of Ser. No. 481,029, Feb. 15, 1990, abandoned.

[51] Int. Cl.$^5$ ................................................ B24B 1/00
[52] U.S. Cl. .................................... 51/317; 51/309; 51/293; 51/284 R; 51/304
[58] Field of Search ............... 51/293, 309, 284 R, 51/DIG. 20, 317; 106/3, 8, 10

[56] References Cited

U.S. PATENT DOCUMENTS

| | | | |
|---|---|---|---|
| 3,832,920 | 9/1974 | Wrue | 82/20 |
| 3,896,688 | 7/1975 | Wrue | 82/1 |
| 4,269,739 | 5/1981 | Grejsner | 252/174.15 |
| 4,534,916 | 8/1985 | Wichterle | 264/2.1 |
| 4,555,372 | 11/1985 | Kunzler et al. | 264/2.1 |
| 4,622,258 | 11/1986 | Minche | 428/171 |
| 4,673,523 | 6/1987 | Smith | 252/173 |
| 4,784,786 | 11/1988 | Smith | 252/173 |

*Primary Examiner*—Mark L. Bell
*Assistant Examiner*—Deborah Jones
*Attorney, Agent, or Firm*—Craig E. Larson; Salvatore P. Pace; David M. Krasnow

[57] ABSTRACT

A method for polishing hydrophilic contact lenses which comprises applying a polish consisting of a substantially water free material that in solution acts as a surfactant and an optional abrasive material to the lens surface to be polished and applying a moving polishing tool to the lens.

5 Claims, No Drawings

SOFT CONTACT LENS PROCESSING AID

CROSS REFERENCE TO RELATED APPLICATION

This is a continuation-in-part of U.S. Ser. No. 07/481,029 filed Feb. 15, 1990 now abandoned.

BACKGROUND OF THE INVENTION

Soft contact lenses are produced by a number of methods including cast molding, spin-casting, lathing and combinations of casting with lathing. Lenses made using spin-casting or cast molding have not generally required extensive polishing although the edges are sometimes polished on lenses made by these methods. For example, when spun-cast lenses are knife-edged as described in U.S. Pat. Nos. 3,832,920 and 3,896,688, it may be desirable to subsequently buff (i.e., polish) the lens edge. Lenses made by lathing techniques require polishing since lathing leaves the surface of the lens striated and unsuitable for use as a contact lens.

In general, the polish compositions used in the manufacture of soft contact lenses have not been publicly disclosed. However, polish compositions known to the applicants and in the art are based upon suspensions of abrasive agents in either silicone or petroleum oils. For instance, suspensions of abrasives in kerosene have been used in processes (as described in U.S. Pat. No. 4,555,372) involving spincasting of a lens blank followed by lathing of the posterior portion of the lens. Soft contact lens materials require polish compositions to be substantially water free since the contact lens materials themselves are polishable only in their unhydrated states. Because of this, soft contact lens polishes differ from other polishes.

Previously known polish compositions have many disadvantages: 1) work areas must be kept ventilated and the fumes from the polish must be collected, 2) the kerosene based polish must be removed from the lens by expensive cleaning procedures involving the use of chloro and fluorocarbons, and 3)the lenses do not release from the molds readily.

SUMMARY OF THE INVENTION

The present invention relates to new compositions for polishing soft contact lenses. The compositions are comprised of a substantially water free surfactant in either a liquid or wax like form. The composition may optionally contain an abrasive agent dispersed throughout. The polish can be removed after the polish step is completed by solvating in water (e.g., during lens hydration) and thus voids costly and inconvenient cleaning processes otherwise necessary. The use of the substantially water free surfactant material also provides a polished surface on the lens which is superior to surfaces produced using previously known material.

DETAILED DESCRIPTION OF THE INVENTION

The polish composition of the present invention comprises a substantially water free surfactant, optionally containing an abrasive agent. The polish may also include a water free oil such as coconut, palm or soybean oil as a diluent.

The substantially water free surfactants useful in the present invention are polymeric materials that have hydrophilic and hydrophobic portions which both serve purposes in the polish and allow for simple washing of the polish off the lens upon completion of the polishing step. Surfactants which may be used include polyoxyethylene lauryl ethers, polyoxyethylene nonylphenyl ethers, polyoxyethylene sorbitan monooleates, polyoxyethylene sorbitan monolaurates, polyoxyethylene sorbitan monopalmitates, polyoxyethylene stearyl ethers, and their polyoxypropylene analogs. When the polish compositions use the surfactant in combination with the abrasive agent the surfactant material should be of low enough molecular weight to be in a liquid or very soft wax form. Molecular weight should be sufficient so as to be able to keep the abrasive agent dispersed.

When a diluent oil is used, the viscosity of the oil and the surfactant material can be chosen so the viscosity of the polish is sufficient to be useable as a polish (i.e. of low enough viscosity to be flowable and high enough viscosity to be substantive). When an abrasive is included, the viscosity may be further adjusted to maintain the abrasive in dispersion.

The abrasive used in the polish composition can be any abrasive agent known to those skilled in the art to be useful in polishing soft contact lens materials. Abrasive agents preferred by the applicants are aluminum oxide powders sold under the tradename Alox 721 and Aluminum Polishing Powder sold under the tradename of X-Pal.

The polish may be applied to either the contact lens surface or to the surface of the polishing tool. Preferably, the polish is applied to the polishing tool. The polishing tool employed is not narrowly critical. Radiused mandrels covered with broadcloth or the like are conventional and preferred. The dimensions of the polishing tool are varied to accommodate lens dimensions and to accomplish the polishing effect sought (e.g., edge polishing or lathed-surface polishing).

EXAMPLE 1

A polish comprised of 9 parts by weight polyoxyethylene sorbitan monooleate and one part by weight Alox was made by combining the two materials and mixing until they were homogeneous. The polish material was then applied to a production lot of polymacon lenses which had been cast in spin-cast mold, lathed and had not yet been further processed. The lenses were polished using a polishing mandrel adapted for the particular lens design.

Upon completion of this step the lenses, while still in the mold, were placed in a heated ultrasonic water bath in order to hydrate the lens and to remove it from the mold. The lenses were then inspected to see if they met standard specifications. Lens lots polished with the present invention produced a minimum of 7 percent higher yields than lens lots employing state of the art polishes.

The surface quality of the lenses produced using the present invention were measured by means of interferometric means and compared with lenses produced using an abrasive-containing, kerosene polish. Results showed that the surface quality is much higher than that achieved by the kerosene-based polish. Further measurement of the lenses showed that the kerosene-based polish gave surface imperfections averaging between 25-100 nm whereas the invention gave surfaces where the average deviation from a perfectly smooth surface was in the order of 15 nm.

EXAMPLE 2

Polymacon contact lenses were produced by spin casting followed by knife edging. The edges of the lenses (while still in the mold) were buffed using a cloth-covered polishing mandrel. Polyoxyethylene (20) sorbitan monooleate was applied to the cloth covering prior to polishing. The lenses, after buffing, were placed in a water bath to hydrate the lenses and to remove them from the molds. The lenses were then inspected and placed on eyes for further evaluation.

The reject rate of lens lots buffed in accordance with this invention averaged 11%. The reject rate of lens lots similarly produced but without the addition of polyoxyethylene sorbitan monooleate during edge buffing averaged 15%. Lenses produced in accordance with this invention, particularly those in moderate to high minus powers, exhibited more desirably, rounded edge geometries than the dry-buffed lenses. Moreover, the surfactant-buffed lenses were significantly more comfortable on-eye than dry-buffed lenses, especially after 5 minutes of lens water.

What is claimed is:

1. In a method for polishing hydrophilic contact lenses by applying a moving polishing tool to the lens wherein the improvement comprises the presence of a substantially water-free surfactant selected from the group consisting of polyoxyethylene sorbitan monooleate, polyoxyethylene lauryl ether, polyoxyethylene nonylphenyl ether, polyoxyethylene sorbitan monolaurate, polyoxyethylene sorbitan monopalmitate, polyoxyethylene stearyl ether and the polyoxypropylene analogs thereof.

2. The method of claim 1 wherein an abrasive material is uniformly distributed throughout the substantially water-free surfactant.

3. The method of claim 2 wherein the abrasive material is aluminum oxide powder.

4. The method of claim 2 wherein the abrasive-containing surfactant material includes d diluent comprising a water-free oil.

5. The method of claim 4 wherein the water-free oil is selected from the group consisting of coconut, palm, and soybean oils.

* * * * *

UNITED STATES PATENT AND TRADEMARK OFFICE
CERTIFICATE OF CORRECTION

PATENT NO. : 5,079,878
DATED : January 14, 1992
INVENTOR(S) : Robert J. Druskis, Rose A. Milne It is certified that error appears in the above-identified patent and that said Letters Patent is hereby corrected as shown below:

Column 3, line 19, change "desirably" to -- desirable --

Column 4, line 18, change "d" to -- a --

Signed and Sealed this

Nineteenth Day of October, 1993

Attest:

BRUCE LEHMAN

Attesting Officer     Commissioner of Patents and Trademarks